United States Patent [19]
Chen

[11] Patent Number: 5,402,710
[45] Date of Patent: Apr. 4, 1995

[54] MIXER MECHANISM FOR AN AUTOMATIC BAKING MACHINE

[76] Inventor: Shang-Hsien Chen, No. 27, Sec. 3, Chung-Shan Rd., Tan-Tzu Hsiang, Taichung Hsien, Taiwan, Prov. of China

[21] Appl. No.: 187,021

[22] Filed: Jan. 27, 1994

[51] Int. Cl.[6] ............................ A47J 27/00; B01F 7/22
[52] U.S. Cl. ................................... 99/348; 99/352; 366/98; 366/314; 366/331
[58] Field of Search .................. 99/348, 483, 484, 485, 99/352; 366/314, 205, 69, 97, 98, 333, 307

[56] References Cited

U.S. PATENT DOCUMENTS

| | | | |
|---|---|---|---|
| 4,957,040 | 9/1990 | Nakakura | 366/98 |
| 4,984,512 | 1/1991 | Takahashi | 366/348 |
| 5,048,402 | 9/1991 | Letournel | 366/314 |
| 5,076,153 | 12/1991 | Takahashi | 366/98 |

*Primary Examiner*—Robert W. Jenkins
*Attorney, Agent, or Firm*—Lowe, Price, LeBlanc & Becker

[57] ABSTRACT

A mixer mechanism is used for an automatic baking machine which includes an oven and a container disposed within the oven so as to bake bread. The mixer mechanism includes a driving device which has a rod member rotated by a motor, and a driving plate member secured to the upper end portion of the rod member. A shaft assembly includes a shaft member journalled on the bottom wall of the container, a driven plate member secured to the bottom end of the shaft member and mounted removably on the driving plate member in such a manner that the shaft assembly rotates synchronously with the rod member, and a positioning unit secured to the top end of the shaft member. A beater assembly includes a sleeve member sleeved removably on the positioning unit, a retaining unit disposed on the upper portion of the inner wall of the sleeve member so as to retain the sleeve member on the positioning unit, a block unit disposed on the inner wall of the sleeve member above the retaining unit and capable of pressing against the positioning unit when the mixer mechanism is in use so as to rotate the sleeve member synchronously with the shaft assembly, and a horizontal blade beater secured to the outer wall of the sleeve member and spaced apart from the bottom wall of the container so as to mix ingredients within the container.

4 Claims, 11 Drawing Sheets

MIXER MECHANISM FOR AN AUTOMATIC BAKING MACHINE

BACKGROUND OF THE INVENTION

1. Field of the Invention

This invention relates to a mixer mechanism for an automatic baking machine, more particularly to a mixer mechanism which can effectively mix ingredients that are put within the container of the automatic baking machine so as to be used for baking bread, and which can be easily removed from the bread.

2. Description of the Related Art

Figure 1:
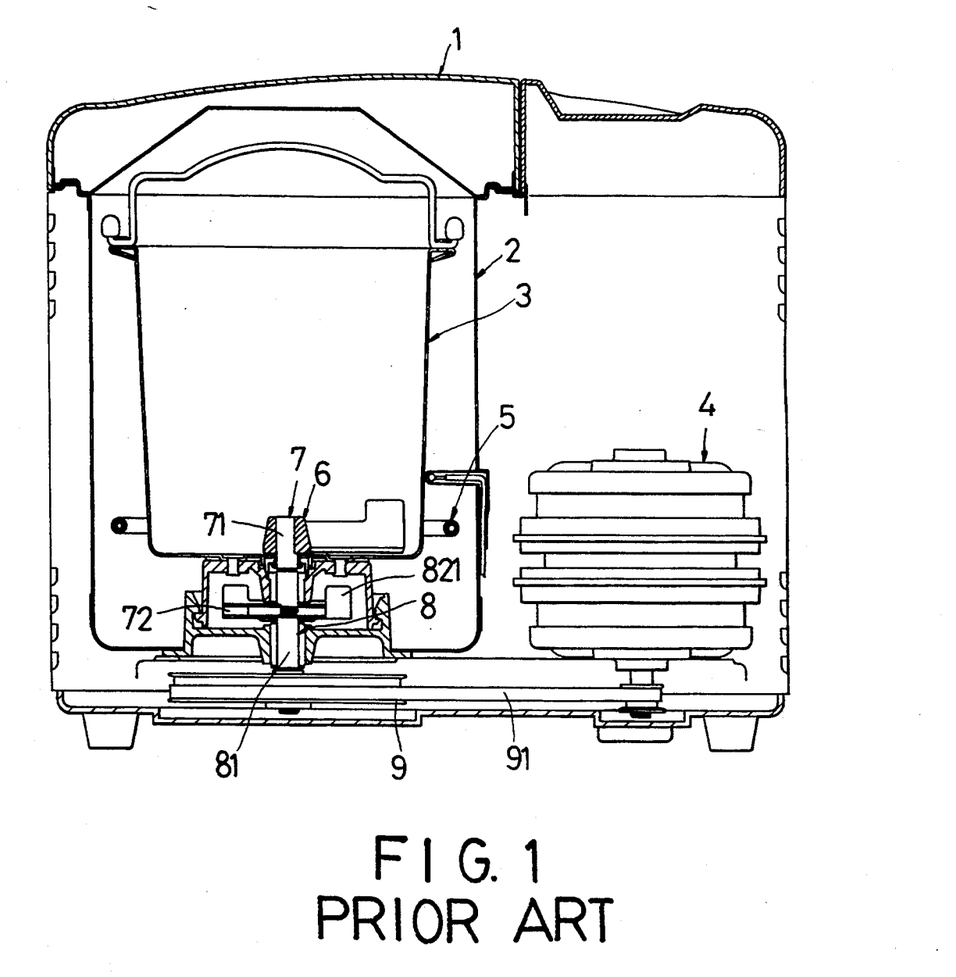
FIG. 1 is a schematic view illustrating a conventional automatic baking machine.

The improvement of this invention is directed to a conventional mixer mechanism which is installed in an automatic baking machine 1, as shown in FIG. 1. The automatic baking machine 1 includes an oven 2 and a container 3 which is disposed within the oven 2 so as to receive ingredients that are used for baking bread therein. The oven 2 includes a motor 4 and a heating device 5 which is capable of heating the container 3 so as to bake bread. The mixer mechanism is journalled on the bottom wall of the container 3, is driven by the motor 4 so as to mix the ingredients within the container 3, and includes a beater assembly 6, a shaft assembly 7, and a driving device 8. The driving device 8 includes a rod member 81 which is adapted to be rotated by the motor 4 in such a manner that the lower end portion of the rod member 81 is secured coaxially to a rotary wheel 9 which is connected to the motor 4 by means of a belt 91. Accordingly, the rod member 81 can be rotated synchronously with the rotary wheel 9 by the motor 4.

Figure 2:
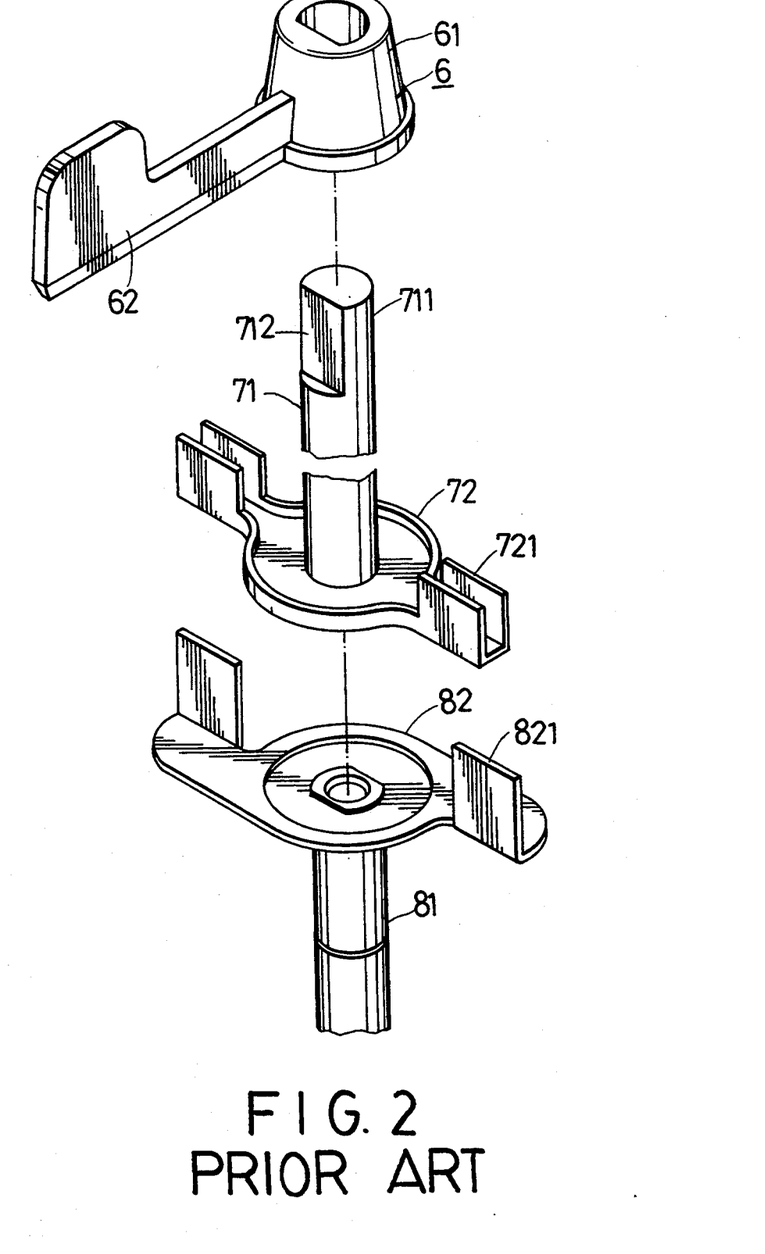
FIG. 2 is an exploded view showing the mixer mechanism of the conventional automatic baking machine.

Referring to FIG. 2, the driving device 8 further includes a horizontal driving plate member 82 which is mounted securely on the top end of the rod member 81 and which has a pair of upright driving plates 821 that are mounted securely on two opposite end portions of the driving plate member 82.

Figure 3:
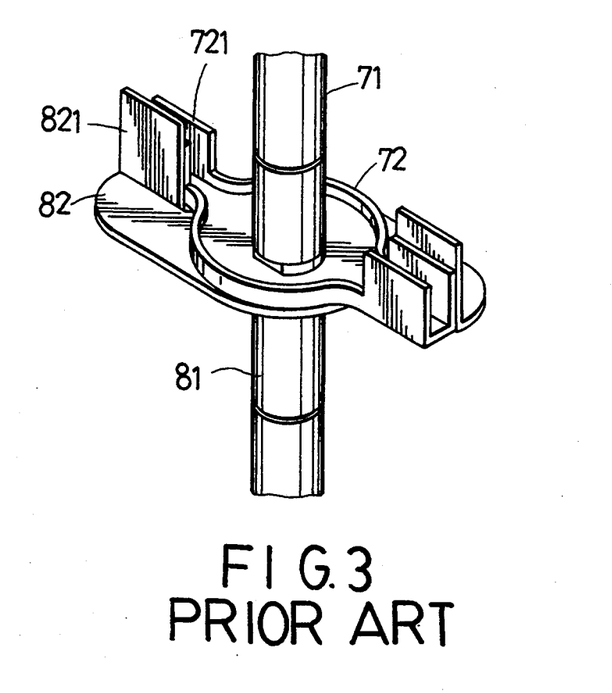
FIG. 3 is a partially perspective view showing the combination of the shaft assembly and the driving device of the mixer mechanism of the conventional automatic baking machine.

The shaft assembly 7 includes a shaft member 71 which is journalled on the bottom wall of the container 3 (see FIG. 1) and a horizontal driven plate member 72 which is mounted securely on the bottom end of the shaft member 71. The driven plate member 72 is mounted removably on the driving plate member 82, and has a pair of upright driven plate units 721 which are secured respectively to two opposite end portions of the driven plate member 72 and which abut respectively against the driving plates 821 of the driving plate member 82, as shown in FIG. 3, so that the shaft assembly 7 can rotate synchronously with the rod member 81. The rod member 81 rotates only in a clockwise direction. Again, referring to FIG. 2, the shaft member 71 has a positioning rod 711 of a generally semicircular cross section which is mounted securely on the top end of the shaft member 71 and which has an upright wall 712. The beater assembly 6 includes a sleeve member 61 which is sleeved removably on the positioning rod 711 and which can be rotated synchronously with the shaft member 71, and a horizontal blade beater 62 which is mounted securely on the outer wall of the sleeve member 61 and which is spaced apart from the bottom wall of the container 3, as shown in FIG. 1, at a distance of 2–3 mm so as to mix the ingredients within the container 3 when the mixer mechanism is in use.

The drawbacks of the conventional mixer mechanism are as follows:

1. When the mixer mechanism is in use, the sleeve member 61 of the beater assembly 6 is easily removed from the positioning rod 711 of the shaft member 71 of the shaft assembly 7. Accordingly, the ingredients within the container 3 cannot be mixed effectively when baking bread.
2. Even though bread can be successfully baked within the container 3, it is difficult to remove the bread from the beater assembly 6 because the bread may attach to the beater assembly 6 when the former is taken away from the container 3. Accordingly, some special tools have to be used to remove the bread from the beater assembly 6 in order to avoid damage thereto. This can result in some inconvenience for a baker.

SUMMARY OF THE INVENTION

The main objective of this invention is to provide a mixer mechanism which is to be installed in an automatic baking machine and which can mix effectively ingredients that are used for baking bread and that is put within the container of the automatic baking machine.

Another objective of this invention is to provide a mixer mechanism which can be easily removed from the bread without the need for using special tools.

According to this invention, a mixer mechanism is used for an automatic baking machine which includes an oven and a container which is disposed within the oven so as to receive ingredients that are used for baking bread. The oven includes a motor and a heating device which is capable of heating the container so as to bake bread. The mixer mechanism is journalled on the bottom wall of the container and is driven by the motor so as to mix the ingredients within the container. The mixer mechanism includes a driving device, a shaft assembly, and a beater assembly. The driving device includes a rod member adapted to be rotated by the motor, and a driving plate member mounted securely on the upper end portion of the rod member. The shaft assembly includes a shaft member journalled on the bottom wall of the container, a driven plate member mounted securely on the bottom end of the shaft member and mounted removably on the driving plate member of the driving device in such a manner that the shaft assembly rotates synchronously with the rod member, and a positioning unit mounted securely on the top end of the shaft member. The beater assembly includes a sleeve member sleeved removably on the positioning unit of the shaft assembly, a retaining unit disposed on the upper portion of the inner wall of the sleeve member so as to retain the sleeve member on the positioning unit, a block unit disposed on the inner wall of the sleeve member above the retaining unit and capable of pressing against the positioning unit when the mixer mechanism is in use so as to rotate the sleeve member synchronously with the shaft assembly, and a horizontal blade beater secured to the outer wall of the sleeve member and spaced apart from the bottom wall of the container at a predetermined distance so as to mix the ingredients within the container.

The positioning unit of the shaft assembly includes a positioning rod of a generally semicircular cross section which has an upright wall and a positioning hole formed in the upright wall, and a spring-biased ball which protrudes from the positioning hole. The retaining unit of the beater assembly includes a protrusion member projecting from a section of the upper portion of the inner wall of the sleeve member toward the upright wall of the positioning rod, a downwardly and outwardly inclined first guide surface in the lower portion of the protrusion member, and an upwardly and outwardly inclined second guide surface in the upper portion of the protrusion member so as to define a contracted space between the intermediate portion of the protrusion member and the remainder section of the inner wall of the sleeve member and between the upper and lower portions of the protrusion member. The contracted space has a size so that the ball is confined between the upright wall of the positioning rod of the shaft assembly and the second guide surface of the retaining unit of the beater assembly in such a manner that the sleeve member can be pulled out forcibly from the positioning rod. The ball of the positioning unit has to align with and slide along the first guide surface so as to push the positioning rod through the contracted space when the sleeve member is to be sleeved on the positioning rod, and has to align with and slide along the second guide surface so as to allow the positioning rod to be pulled out of the sleeve member through the contracted space when the sleeve member is to be removed from the positioning rod. The block unit of the beater assembly includes a projection member protruding from the inner wall of the sleeve member toward the upright wall of the positioning rod on a side of the second guide surface, and pressing against the ball of the positioning unit when the mixer mechanism is in use so that the positioning rod rotates the sleeve member synchronously with the shaft assembly.

BRIEF DESCRIPTION OF THE DRAWING

Other features and advantages of this present invention will become apparent in the following detailed description of a preferred embodiment of this invention, with reference to the accompanying drawings, in which.

DETAILED DESCRIPTION OF THE PREFERRED EMBODIMENT

Figure 4:
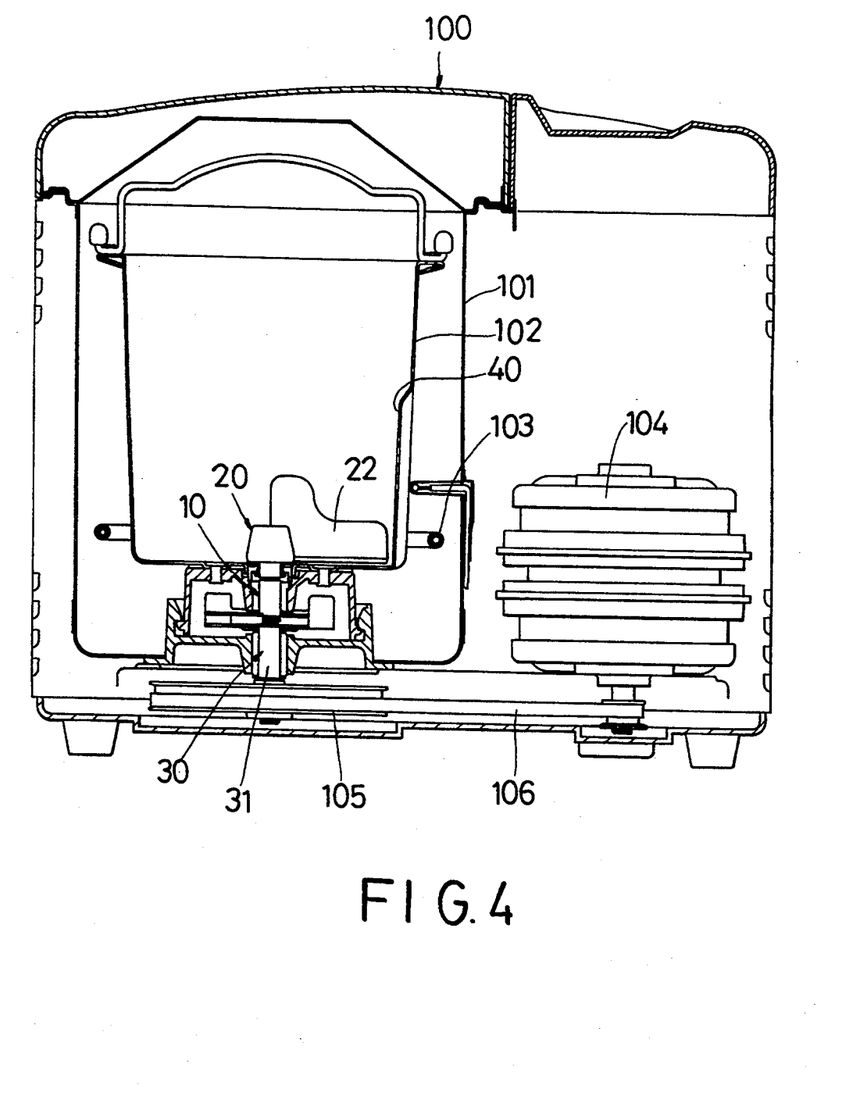
FIG. 4 is a schematic view illustrating a mixer mechanism of the preferred embodiment of this invention which is installed in an automatic baking machine.

Referring to FIG. 4, a mixer mechanism of the preferred embodiment of this invention is installed in an automatic baking machine 100 which includes an oven 101 and a container 102 which is disposed within the oven 101 so as to receive ingredients 200 (see FIG. 9) that are used for baking bread. The oven 101 includes a motor 104 and a heating device 103 which is capable of heating the container 102 so as to bake bread. The mixer mechanism is journalled on the bottom wall of the container 102, is driven by the motor 104 so as to mix the ingredients 200 (see FIG. 9) within the container 102, and includes a shaft assembly 10, a beater assembly 20, and a driving device 30. The driving device 30 includes a rod member 31 which is adapted to be rotated by the motor 104 in such a manner that the lower end portion of the rod member 31 is secured coaxially to a rotary wheel 105 which is connected to the motor 104 by means of a belt 106. Accordingly, the rod member 31 can be rotated synchronously with the rotary wheel 105 by means of the motor 104.

Figure 5:
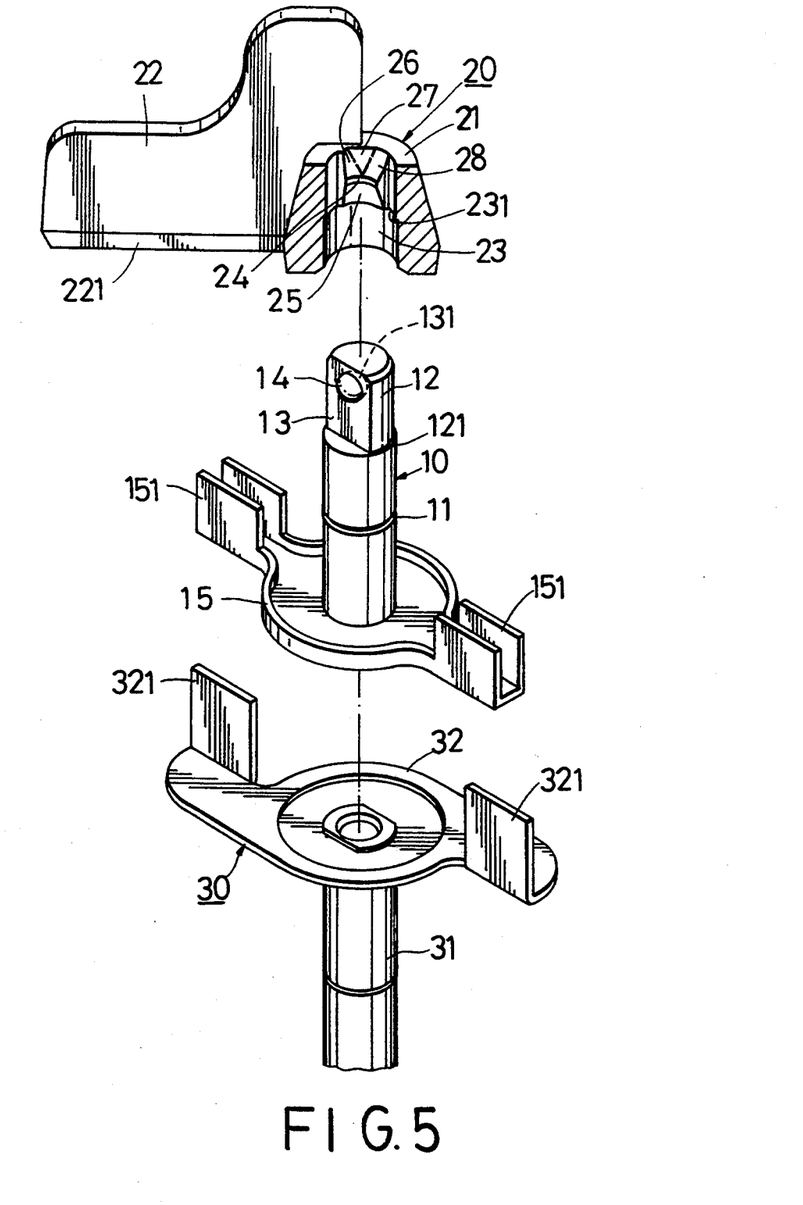
FIG. 5 is an exploded view showing the mixer mechanism of this invention which includes a driving device, a shaft assembly, and a beater assembly.

Referring to FIG. 5, the driving device 30 further includes a horizontal driving plate member 32 which is mounted securely on the upper end portion of the rod member 31 and which has a pair of upright driving plates 321 that are secured respectively to two opposite end portions of the driving plate member 32.

The shaft assembly 10 includes a shaft member 11 which is journalled on the bottom wall of the container 102 (see FIG. 4), a positioning unit which is mounted securely on the top end of the shaft member 11, and a horizontal driven plate member 15 which is mounted securely on the bottom end of the shaft member 11. The driven plate member 15 is mounted removably on the driving plate member 32, and has a pair of upright driven plate units 151 which are secured respectively to two opposite end portions of the driven plate member 15 and which abut respectively against the driving plates 321 of the driving plate member 32 of the driving device 30 (similar to the conventional manner, as shown in FIG. 3) so that the shaft assembly 10 rotates synchronously with the rod member 31. The positioning unit of the shaft assembly 10 includes a positioning rod 12 of a generally semicircular cross section which has an upright wall 13 and a positioning hole 131 formed in the upright wall 13, and a spring-bias ball 14 which protrudes from the positioning hole 131. The positioning rod 12 has a diameter smaller than that of the shaft member 11 so as to define an uprightly facing first shoulder 121 between the positioning rod 12 and the shaft member 11.

The beater assembly 20 includes a sleeve member 21 which is sleeved removably on the positioning rod 12 of the shaft assembly 10. A retaining unit is disposed on the upper portion of the inner wall 23 of the sleeve member 21 so as to retain the sleeve member 21 on the positioning rod 12 of the shaft assembly 10. A block unit is disposed on the inner wall 23 of the sleeve member 21 above the retaining unit and is capable of pressing against the ball 14 of the positioning unit of the shaft assembly 10 when the mixer mechanism is in use so that the beater assembly 20 can be rotated synchronously with the shaft assembly 10. A horizontal blade beater 22 is mounted securely on the outer wall of the sleeve member 21 and is spaced apart from the bottom wall of the container 102 (see FIG. 4) at a distance of 2-3 mm so as to mix the ingredients 200 (see FIG. 9). The inner wall 23 of the sleeve member 21 has a downwardly facing second shoulder 231 which abuts against the first shoulder 121 (as best shown in FIG. 8) so as to avoid the downward movement of the sleeve member 21.

Figure 6:
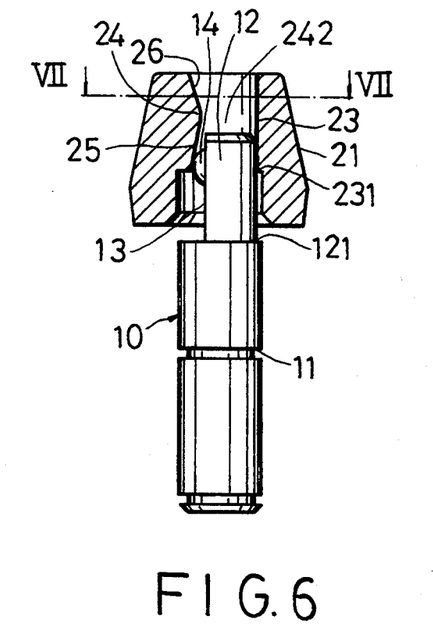
FIG. 6 is a schematic view illustrating how to sleeve the sleeve member of the beater assembly on the positioning unit of the shaft assembly according to this invention.

Referring to FIGS. 5 and 6, the retaining unit of the beater assembly 20 includes a protrusion member 24 which projects from a section of the upper portion of the inner wall 23 of the sleeve member 21 toward the upright wall 13 of the positioning rod 12. A downwardly and outwardly inclined first guide surface 25 is located in the lower portion of the protrusion member 24. An upwardly and outwardly inclined second guide surface 26 is located in the upper portion of the protrusion member 24 so as to define a contracted space 241 between the intermediate portion of the protrusion member 24 and the remainder section of the inner wall 23 of the sleeve member 21 and between the upper and lower portions of the protrusion member 24. The second guide surface 26 has a triangular retaining portion 27, as best shown in FIG. 7, which is formed in the middle section of the second guide surface 26 and which has a straight side in alignment with the top side of the second guide surface 26.

Figure 7:
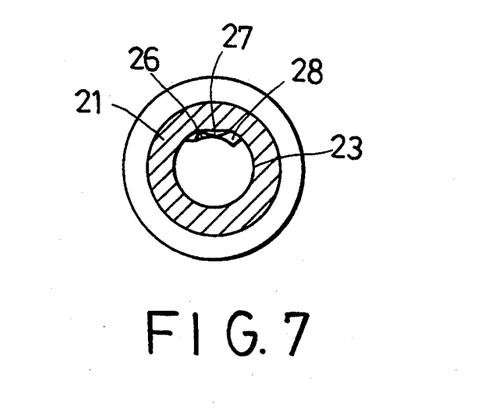
FIG. 7 is a sectional view of the sleeve member of the beater assembly taken along the line VII—VII in FIG. 6.
Figure 8:
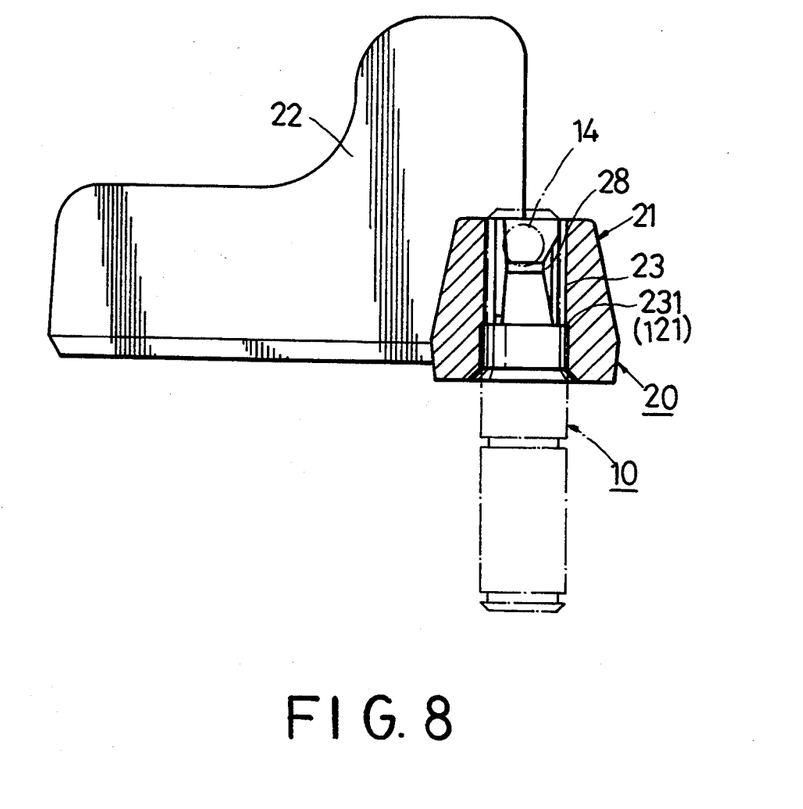
FIGS. 8 and 9 are schematic views illustrating how the sleeve member of the beater assembly is positioned on positioning unit of the shaft assembly according to this invention.

Referring to FIGS. 6, 7, and 8, the contracted space 241 (see FIG. 6) is sized so that the ball 14 is confined between the upright wall 13 of the shaft assembly 10 and the retaining portion 27 of the second guide surface 26 of the beater assembly 20 in such a manner that the sleeve member 21 can be pulled out forcibly from the positioning rod 12. The ball 14 of the positioning unit has to align with and slide along the first guide surface 25 so as to push the positioning rod 12 through the contracted space 241 (see FIG. 6) when the sleeve member 21 is to be sleeved on the positioning rod 12, and has to align with and slide along the retaining portion 27 of the second guide surface 26 so as to allow the positioning rod 12 to be pulled out of the sleeve member 21 through the contracted space 241 (see FIG. 6) when the sleeve member 21 is to be removed from the positioning rod 12.

Figure 9:
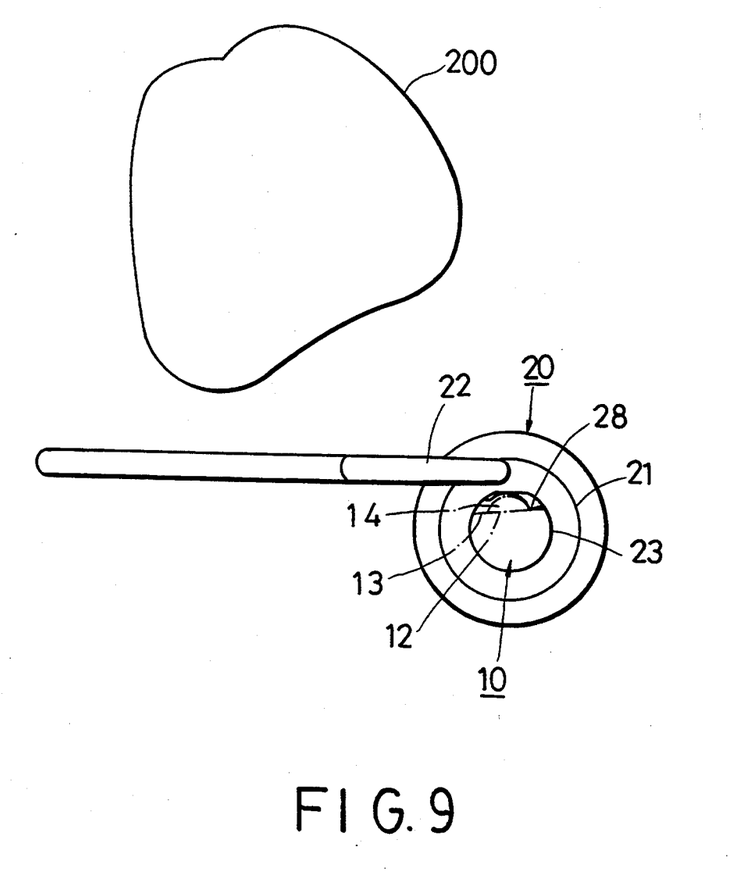
Figure 10:
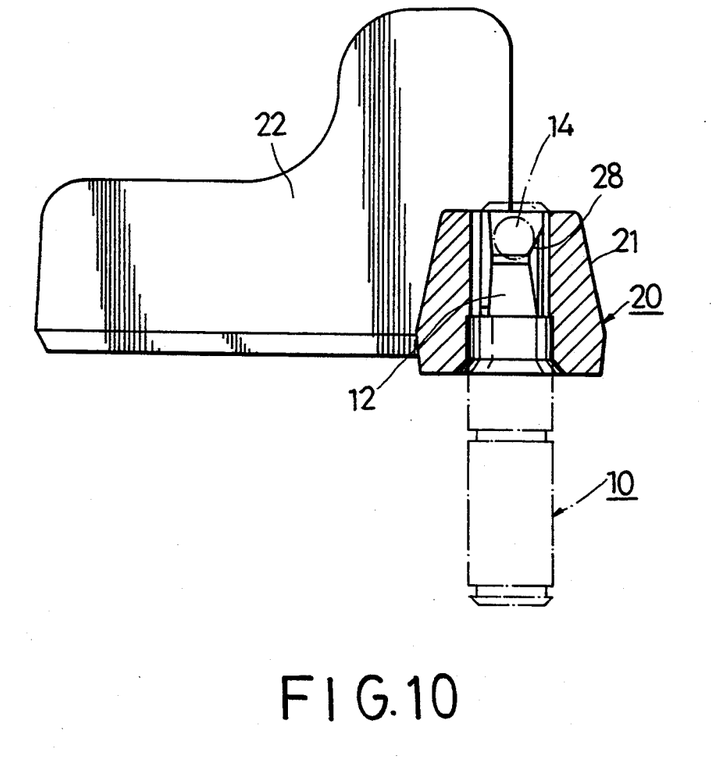
FIGS. 10 and 11 are schematic views illustrating the engagement of the sleeve member of the beater assembly and the positioning unit of the shaft assembly when the mixer mechanism of this invention is in use.
Figure 11:
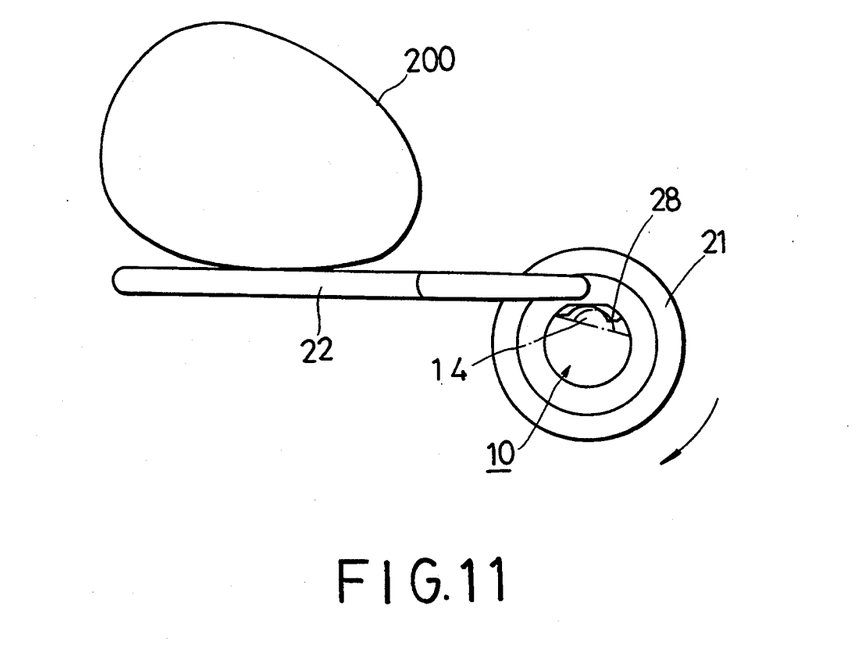

Referring to FIGS. 8 and 9, the block unit of the beater assembly 20 includes a projection member 28 which protrudes from the inner wall 23 of the sleeve member 21 toward the upright wall 13 of the positioning rod 12 on a side of the second guide surface 26 (see FIG. 7). Referring to FIGS. 10 and 11, when the mixer mechanism is in use, the positioning rod 12 rotates in a clockwise direction so that the ball 14 of the positioning unit presses against the projection member 28, thereby rotating the sleeve member 21 and the blade beater 22 synchronously with the positioning rod 12. In this way, the blade beater 22 can mix the ingredients 200. Because the ball 14 of the positioning rod 12 presses against the projection member 28 when the mixer mechanism is in use, the sleeve member 21 can be sleeved tightly on the positioning rod 12 of the shaft assembly 10. When it is desired to remove bread from the container 102, the container 102 has to be taken out of the automatic baking machine 100 along with the beater assembly 20 and the shaft assembly 10, and then is inverted so as to allow the bread to slide out of the container 102. In this way, the beater assembly 20 cannot be taken away from the container 102 along with the bread because the engagement of the positioning unit of the shaft assembly 10 and the retaining unit of the beater assembly 20 can hold effectively the sleeve member 21 of the sleeve assembly 20 on the positioning rod 12 of the shaft assembly 10. Accordingly, there is no need to use special tools to remove the beater assembly 20 from the bread.

Figure 12:
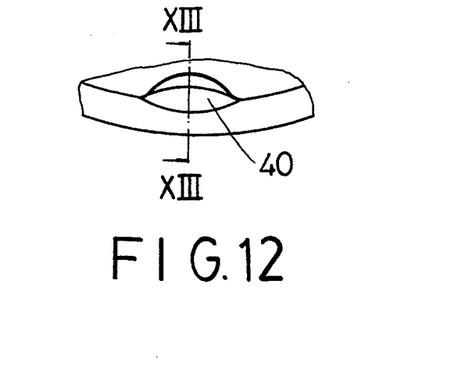
FIG. 12 is an elevational top view showing the protrusion of the mixer mechanism of this invention which projects radially and inwardly from the inner wall of the container of the automatic baking machine.
Figure 13:
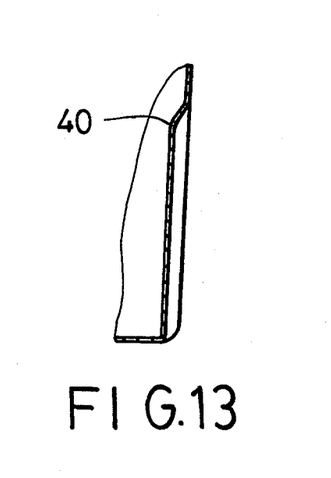
FIG. 13 is a sectional view showing the protrusion of the mixer mechanism taken along the line XIII—XIII in FIG. 12.

Again, referring to FIG. 4, the mixer mechanism further includes three longitudinal protrusions 40 (only one is shown) which project radially and inwardly from the inner wall of the container 102 and which are spaced radially apart from the distal end of the blade beater 22 at a distance of 3-5 mm so that the protrusions 40 help the blade beater 22 to mix the ingredients 200 (see FIG. 11). FIGS. 12 and 13 show the construction of each of the protrusions 30. As shown, each of the protrusions 40 has a generally semicircular cross section.

Figure 14:
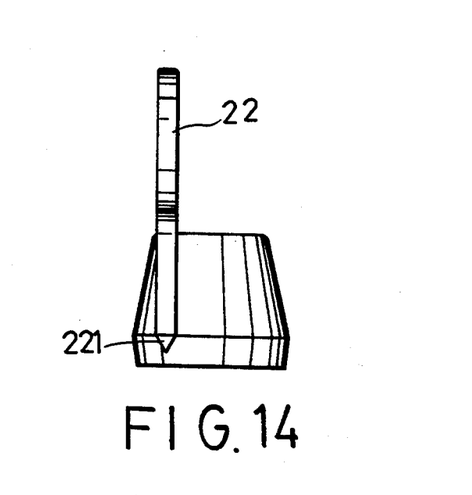
FIG. 14 is a schematic view illustrating the horizontal blade beater of the beater assembly of the mixer mechanism in accordance with this invention.

Referring to FIGS. 5 and 14, the blade beater 22 of the beater assembly 20 has a downwardly tapered bottom end 221 so as to facilitate the removal of bread within the container 102 from the blade beater 22.

Preferably, the blade beater 22 can made of Teflon, and the inner wall of the container 102 (see FIG. 4) can be coated with Teflon so that the bread can be removed from the blade beater 22 and the container 102 easily.

With this invention thus explained, it is apparent that numerous modifications and variations can be made without departing from the scope and spirit of this invention. It is therefore intended that this invention be limited only as indicated in the appended claims.

I claim:

1. A mixer mechanism for an automatic baking machine, said automatic baking machine including an oven and a container which is disposed within said oven so as to receive ingredients for baking bread therein, said oven including a motor and a heating device which is capable of heating said container so as to bake bread, said mixer mechanism being journalled on a bottom wall of said container and being drivable by means of said motor so as to mix said ingredients within said container, said mixer mechanism comprising:

a driving device including a rod member adapted to be rotated by said motor, and a driving plate member mounted securely on an upper end portion of said rod member;

a shaft assembly including a shaft member journalled on said bottom wall of said container, a driven plate member mounted securely on a bottom end of said shaft member and mounted removably on said driving plate member of said driving device in such a manner that said shaft assembly rotates synchronously with said rod member, and a positioning unit mounted securely on a top end of said shaft member; and a beater assembly including a sleeve member sleeved removably on said positioning unit of said shaft assembly, a retaining unit disposed on an upper portion of an inner wall of said sleeve member so as to retain said sleeve member on said positioning unit, a block unit disposed on said inner wall of said sleeve member above said retaining unit and capable of pressing against said positioning unit when said mixer mechanism is in use so as to rotate said sleeve member synchronously with said shaft assembly, and a horizontal blade beater secured to an outer wall of said sleeve member and spaced apart from said bottom wall of said container at a predetermined distance so as to mix said ingredients within said container;

wherein said positioning unit of said shaft assembly includes a positioning rod of a generally semicircular cross section which has an upright wall and a positioning hole formed in said upright wall, and a spring-biased ball which protrudes from said positioning hole;

said retaining unit of said beater assembly including a protrusion member projecting from a section of said upper portion of said inner wall of said sleeve member toward said upright wall of said positioning rod, a downwardly and outwardly inclined first guide surface in a lower portion of said protrusion member, and an upwardly and outwardly inclined second guide surface in an upper portion of said protrusion member so as to define a contracted space between an intermediate portion of said protrusion member and a remainder section of said inner wall of said sleeve member and between said upper and lower portions of said protrusion member, said contracted space being sized so that said ball is confined between said upright wall of said shaft assembly and said second guide surface of said beater assembly in such a manner that said sleeve member can be pulled out forcibly from said positioning rod, said ball of said positioning unit being aligned with and sliding along said first guide surface so as to push said positioning rod through said contracted space when said sleeve member is sleeved on said positioning rod, and being aligned with and sliding along said second guide surface so as to allow said positioning rod to be pulled out of said sleeve member through said contracted space when said sleeve member is removed from said positioning rod; and said block unit of said beater assembly including a projection member protruding from said inner wall of said sleeve member toward said upright wall of said positioning rod on a side of said second guide surface and pressing against said ball of said positioning unit when said mixer mechanism is in use so that said positioning rod rotates said sleeve member synchronously with said shaft assembly.

2. A mixer mechanism for an automatic baking machine as claimed in claim 1, wherein said positioning rod has a diameter smaller than that of said shaft member so as to define an upwardly facing first shoulder between said positioning rod and said shaft member, said inner wall of said sleeve member having a downwardly facing second shoulder abutting against said first shoulder so as to avoid downward movement of said sleeve member.

3. A mixer mechanism for an automatic baking machine as claimed in claim 1, wherein said mixer mechanism further has a plurality of longitudinal protrusions projecting radially and inwardly from an inner wall of said container and being spaced radially apart from a distal end of said blade beater at a predetermined distance so that said protrusions help said blade beater to mix said ingredients within said container when said mixer mechanism is in use.

4. A mixer mechanism for an automatic baking machine as claimed in claim 1, wherein said blade beater of said beater assembly has a downwardly tapered bottom end so as to facilitate removal of said bread within said container from said blade beater.

* * * * *